US006484525B1

(12) United States Patent
Piao et al.

(10) Patent No.: US 6,484,525 B1
(45) Date of Patent: Nov. 26, 2002

(54) AIR CONDITIONER

(75) Inventors: Chun-cheng Piao, Osaka (JP); Ryuichi Sakamoto, Osaka (JP); Yuji Watanabe, Osaka (JP); Manabu Yoshimi, Osaka (JP); Kazuo Yonemoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/936,699

(22) PCT Filed: Mar. 1, 2000

(86) PCT No.: PCT/JP00/01211

§ 371 (c)(1),
(2), (4) Date: Sep. 17, 2001

(87) PCT Pub. No.: WO00/55550

PCT Pub. Date: Sep. 21, 2000

(30) Foreign Application Priority Data

Mar. 17, 1999 (JP) .......................................... 11-071397

(51) Int. Cl.[7] ............................................... F25D 23/00
(52) U.S. Cl. ................................ 62/271; 62/94; 62/93; 62/412
(58) Field of Search ........................... 62/271, 94, 412, 62/93

(56) References Cited

U.S. PATENT DOCUMENTS

| | | | | |
|---|---|---|---|---|
| 4,418,546 A | * 12/1983 | Buswell | ....................... | 62/115 |
| 4,474,021 A | * 10/1984 | Harband | ......................... | 62/94 |
| 4,786,301 A | * 11/1988 | Rhodes | ......................... | 62/271 |
| 5,732,562 A | * 3/1998 | Moratalla | ....................... | 62/94 |
| 6,199,394 B1 | * 3/2001 | Maeda | ......................... | 62/271 |

FOREIGN PATENT DOCUMENTS

| | | |
|---|---|---|
| GB | 2242261 | * 9/1991 |
| JP | 62-223573 | * 10/1987 |
| JP | 2-187542 | * 7/1990 |
| JP | 3-79977 | * 4/1991 |
| JP | 5-305215 | * 11/1993 |
| JP | 6-213521 | * 8/1994 |
| JP | 8-178350 | * 7/1996 |

OTHER PUBLICATIONS

English Translation of the International Preliminary Examination Report issued for the PCT application (PCT/JP00/01212).

* cited by examiner

*Primary Examiner*—William Doerrler
*Assistant Examiner*—Mark S. Shulman
(74) *Attorney, Agent, or Firm*—Nixon Peabody LLP; Donald R. Studebaker

(57) ABSTRACT

A first channel (20) is formed by sequentially connecting a compressor (21), a vapor separator (55), a heat exchanger (30) and an expander (22). In the first channel (20), a room air is taken as a primary air and discharged to outdoors. A second channel (40) is formed by connecting a heat exchanger (30) to a second inlet duct (43) and a second outlet duct (44). In the second channel (40), an outside air is taken as a secondary air and supplied to a room. The vapor separator (55) is connected to a vacuum pump (36). The vapor separator (55) separates vapor from the compressed primary air to dehumidify the primary air to or below the absolute humidity of the outside air. The vapor separated by the vapor separator (55) is partly supplied to the secondary air in the second outlet duct (44). Then, the secondary air thus humidified is supplied to the room.

21 Claims, 9 Drawing Sheets

AIR CONDITIONER

TECHNICAL FIELD

This invention relates to an air conditioning system using an air cycle.

BACKGROUND ART

A conventional refrigerator operating through an air cycle is disclosed, for example, in "Shin-ban Reito-Kucho-Binran Dai-4-han Kiso-hen" pp.45–48, published by Japan Society of Refrigerating and Air Conditioning Engineers. Alternatively, a heating system in which an air cycle is used to form a heat pump is disclosed in "AIRAH JOURNAL" June 1997 pp.16–21, published by The Australian Institute of Refrigeration Air Conditioning and Heating. Hereinafter, this heating system will be described.

As shown in FIG. 9, the above heating system comprises a heat source side channel (a) and a heat application side channel (f). The heat source side channel (a) is formed by connecting a compressor (b), a first heat exchanger (c), a second heat exchanger (d) and an expander (e) in this order and arranged to operate through an air refrigeration cycle. On the other hand, the heat application side channel (f) is formed by connecting the second heat exchanger (d), a humidifier (g) and the first heat exchanger (c) in this order.

Further, in the heat source side channel (a), when the compressor (b) is driven, a room air being discharged for ventilation is taken in the compressor (b) and compressed therein. The compressed air sequentially flows through the first heat exchanger (c) and the second heat exchanger (d), is expanded in the expander (e) and is then discharged to outdoors. On the other hand, in the heat application side channel (f), an outside air being supplied to the room for ventilation is taken in and sequentially flows through the second heat exchanger (d), the humidifier (g) and the first heat exchanger (c). During this flow, the outside air is heated through heat exchange with the air of the heat source side channel (a) in both the heat exchangers (d, c) and humidified in the humidifier (g). The system provides heating for the room by heating and humidifying the outside air taken in the heat application side channel (f) and then supplying it to the room.

Problems to Be Solved

As described above, in the conventional heating system, the room air taken in the heat source side channel (a) does nothing but to sequentially flow through the compressor (b), both the heat exchangers (c, d) and the expander (e). Therefore, the following problems arise.

The actual air contains a certain amount of moisture. The air reaches a low temperature through expansion in the expander. Therefore, moisture in the air is condensed so that water droplets will be ejected together with the air from the expander. Further, when the heating system is operated as a heat pump, the temperature of the air undergoing expansion often drops to sub-zero Celsius temperatures. In this case, moisture in the air may be frozen into ice and ejected as snow combined with the air.

This problem is highlighted particularly in such a structure that supplies a room air to the compressor as in the above-described heating system. Specifically, during heating, the absolute humidity of a room air is generally higher than that of an outside air. Therefore, the air higher in absolute humidity than the outside air will be discharged from the compressor. As a result, not only moisture in the air may be condensed at the expansion, but also moisture in the air discharged from the expander may be condensed and blown out as mist.

Accordingly, the conventional heating system requires a structure for disposing of water droplets and ice discharged together with the air from the expander. Particularly, when the system has caused freezing, the processes of defrosting ice and then draining off defrosted water are needed. This creates the need for components for such processes and therefore induces the problem that the system construction is complicated.

On the contrary, if the air temperature at the inlet of the expander is elevated and the air temperature at the outlet of the expander is thereby increased, it can be prevented that moisture in the air discharged from the expander is condensed. Therefore, the above problem can be avoided. In this case, however, it is necessary to increase the input to the compressor in order to ensure a required heating capacity. This induces the problem of decreasing the COP (coefficient of performance).

If a structure is adopted which supplies an outside air to the heat exchanger in order to cool the compressed air as for example in the above-described heating system, the air temperature at the inlet of the expander may be reduced to provide improved COP because during heating the outside air is generally at a relatively low temperature. In this case, however, the air temperature at the outlet of the condenser cannot be reduced enough to avoid the above-described problem resulting from moisture condensation. Therefore, it is impossible to reduce the air temperature at the inlet of the expander to provide improved COP.

The present invention has been made in view of the foregoing points and therefore has its object of maintaining a high COP and concurrently providing a simplified construction of the system by eliminating the need for drainage and snow removal processes.

DISCLOSURE OF INVENTION

The present invention provides for dehumidifying an air, which works in an air cycle, in a portion of the cycle upstream of an expander (22) until the air reaches the absolute humidity of an outside air or below.

More specifically, a first solution taken in the present invention is directed to an air conditioning system that is formed with an air cycle circuit (20) including a compressor (21), a heat exchanger (30) and an expander (22) and configured to provide heating for a room by heating a secondary air through heat exchange with a primary air of the air cycle circuit (20) in the heat exchanger (30) and then supplying the heated secondary air to the room. Further, the system is provided with dehumidifying means (55, 60) for dehumidifying the primary air so that the absolute humidity of the primary air is equal to or below the absolute humidity of an outside air, the dehumidifying means (55, 60) being disposed in a portion of the air cycle circuit (20) upstream of the expander (22).

In a second solution taken in the present invention, based on the first solution, the primary air is an exhaust air being discharged from the room to outdoors or a mixed air of the exhaust air and an outside air and is discharged to outdoors through the expander (22), while the secondary air is an inlet air being supplied from outdoors to the room or a mixed air of the inlet air and a room air and is supplied to the room through the dehumidifying means (55, 60).

In a third solution taken in the present invention, based on the second solution, the dehumidifying means (55, 60) is arranged to supply to the secondary air moisture having been removed from the primary air.

In a fourth solution taken in the present invention, based on any one of the first to third solutions, the dehumidifying means (55) is disposed in a portion of the air cycle circuit (20) located between the compressor (21) and the expander (22) and arranged to dehumidify the primary air compressed by the compressor (21).

In a fifth solution taken in the present invention, based on the fourth solution, the dehumidifying means (55) includes a separation membrane configured so that vapor in the air is permeable from higher side to lower side in vapor partial pressure of the separation membrane, and is arranged to separate vapor from the primary air without condensation.

In a sixth solution taken in the present invention, based on the fifth solution, the separation membrane is formed of a polymer film and configured so that vapor permeates therethrough by diffusion of water molecules into the membrane.

In a seventh solution taken in the present invention, based on the fifth solution, the separation membrane has a large number of pores of substantially the same size as a free path of molecules and configured so that vapor permeates therethrough by capillary condensation and diffusion of water molecules.

In an eighth solution taken in the present invention, based on the fifth solution, the dehumidifying means (55) is arranged to contact one surface of the separation membrane with the compressed primary air and contact the other surface thereof with the secondary air to transfer vapor in the primary air to the secondary air.

In a ninth solution taken in the present invention, based on the fifth solution, pressure reducing means (36) is provided for reducing the pressure of one side of the separation membrane of the dehumidifying means (55) to ensure a difference in vapor partial pressure between both sides of the separation membrane.

In a tenth solution taken in the present invention, based on any one of the first to third solutions, the dehumidifying means (55) is disposed in a portion of the air cycle circuit (20) upstream of the compressor (21) and arranged to dehumidify the primary air to be supplied to the compressor (21).

In an eleventh solution taken in the present invention, based on the tenth solution, the dehumidifying means (60) includes a humidity medium for absorbing and releasing moisture through contact with an air and arranged to allow the humidity medium to absorb moisture in the primary air to be supplied to the compressor (21) while releasing the moisture therein to the secondary air thereby continuously dehumidifying the primary air.

In a twelfth solution taken in the present invention, based on the eleventh solution, the humidity medium of the dehumidifying means (60) is provided with a solid adsorbent for adsorbing moisture.

In a thirteenth solution taken in the present invention, based on the twelfth solution, the humidity medium of the dehumidifying means (60) is formed of a rotor member (61) that is formed in the shape of a disc to allow air passage in a direction of its thickness and provides contact of the passing air with the solid adsorbent, and the dehumidifying means (60) is provided with a moisture absorbing section (62) where the rotor member (61) absorbs moisture in the primary air through contact with the primary air, a moisture releasing section (63) where the rotor member (61) releases moisture therein to the secondary air through contact with the secondary air, and a drive mechanism for rotatively driving the rotor member (61) to allow the rotor member (61) to move between the moisture absorbing section (62) and the moisture releasing section (63).

In a fourteenth solution taken in the present invention, based on the twelfth solution, the solid adsorbent is made of porous inorganic oxide.

In a fifteenth solution taken in the present invention, based on the eleventh solution, the humidity medium of the dehumidifying means (60) comprises a liquid absorbent for absorbing moisture.

In a sixteenth solution taken in the present invention, based on the eleventh solution, the humidity medium of the dehumidifying means (60) comprises a liquid absorbent for absorbing moisture, and the dehumidifying means (60) is arranged so that the liquid absorbent is heated by the primary air coming from the compressor (21) to release moisture having absorbed from the primary air to the secondary air.

In a seventeenth solution taken in the present invention, based on the fifteenth or sixteenth solution, the dehumidifying means (60) includes a moisture-permeable, hydrophobic porous membrane and is arranged to contact the liquid absorbent with the primary air through the hydrophobic porous membrane.

In an eighteenth solution taken in the present invention, based on the fifteenth or sixteenth solution, the liquid absorbent is made of a water solution of hydrophilic organic compound.

In a nineteenth solution taken in the present invention, based on the fifteenth or sixteenth solution, the liquid absorbent is made of a water solution of metallic halide.

In a twentieth solution taken in the present invention, based on the fifteenth or sixteenth solution, the dehumidifying means (60) comprises a circulation circuit (64) that includes a moisture absorbing section (65) for contacting the liquid absorbent with the primary air and a moisture releasing section (66) for contacting the liquid absorbent with the secondary air and circulates the liquid absorbent between the moisture absorbing section (65) and the moisture releasing section (66).

A twenty-first solution taken in the present invention is, based on any one of the eleventh to twentieth solutions, provided with humidity adjusting means (90) for adding part of moisture being released from the humidity medium to part of the secondary air supplied to the dehumidifying means (60) and then supplying the part of the secondary air to the room, while adding the remaining part of moisture being released from the humidity medium to the remaining part of the secondary air, cooling and dehumidifying the remaining part of the secondary air through heat exchange with the secondary air not yet supplied to the heat exchanger (30) and then supplying the remaining part of the secondary air to the room.

Operations

In the first solution, the air cycle circuit (20) operates through an air cycle in a manner that the primary air flows through the compressor (21), the heat exchanger (30) and the expander (22) in this order. In the heat exchanger (30), the secondary air undergoes heat exchange with the compressed primary air so that it is heated. Then, the heated secondary air is supplied to the room thereby providing heating for the room. On the other hand, the primary air is dehumidified by the dehumidifying means (55, 60) so as to reach the absolute humidity of the outside air or below before it arrives at the expander (22). Therefore, even if the temperature of the primary air at the outlet of the expander (22) is set lower than the outside air temperature, it can be prevented that water droplets or ices are produced in the primary air at the outlet of the expander (22).

In the second solution, an air containing at least an exhaust air from the room is taken in as a primary air, flows through the compressor (21), the heat exchanger (30) and the expander (22) in this order, and is then discharged to outdoors. This air is dehumidified by the dehumidifying means (55, 60) before it arrives at the expander (22). Further, an air containing at least an inlet air from outdoors is taken in as a secondary air, is heated through heat exchange with the primary air in the heat exchanger (30), and is then supplied to the room.

In the third solution, the dehumidifying means (55, 60) effects removal of moisture from the primary air and supply of the moisture to the secondary air. In other words, in the dehumidifying means (55, 60), the moisture removed from the primary air is used to humidify the secondary air.

In the fourth solution, moisture is removed from the primary air, which has been compressed by the compressor (21), by the dehumidifying means (55).

In the fifth solution, since the dehumidifying means (55) includes the given separation membrane, moisture in the compressed primary air is separated from the primary air while maintaining its vapor state.

In the sixth or seventh solution, the separation membrane is configured to allow vapor to permeate therethrough in the given course.

In the eighth solution, the compressed air contacts one surface of the separation membrane, while the secondary air contacts the other surface thereof. Accordingly, in operating conditions where the vapor partial pressure of the secondary air is lower than that of the primary air, moisture in the primary air is transferred to the secondary air without any external action being placed thereon.

In the ninth solution, a difference in vapor partial pressure between both sides of the separation membrane can be ensured by the pressure reducing means (36). In other words, the separation membrane is contacted on one surface thereof by the compressed primary air and reduced in pressure on the other surface side thereof by the pressure reducing means (36). Accordingly, the vapor partial pressure on the other surface side of the separation membrane can be maintained lower than the primary air.

In the tenth solution, the primary air dehumidified by the dehumidifying means (55) is supplied to the compressor (21).

In the eleventh solution, the humidity medium of the dehumidifying means absorbs moisture in the primary air and releases the absorbed moisture to the secondary air. In other words, the moisture in the primary air is continuously transferred to the secondary air through the humidity medium. This provides continuous dehumidification of the primary air and continuous humidification of the secondary air.

In the twelfth solution, the humidity medium absorbs moisture in such a manner that the moisture is adsorbed on the solid adsorbent. Further, the humidity medium releases moisture in such a manner that the moisture is desorbed from the solid adsorbent.

In the thirteenth solution, the humidity medium is formed of a disc-shaped rotor member (61). A portion of the rotor member (61) absorbs moisture through contact with the primary air in the moisture absorbing section (62). The rotor member (61) is rotatively driven by the drive mechanism so that the portion of the rotor member (61) which has absorbed moisture moves to the moisture releasing section (63). In the moisture releasing section (63), the rotor member (61) releases the moisture through contact with the secondary air. The rotor member (61) as the humidity medium is thereby regenerated. Thereafter, the portion of the rotor member (61) which has been regenerated moves to the moisture absorbing section (62) again and repeats these actions.

In the fourteenth solution, the solid adsorbent is made of porous inorganic oxide. It is to be noted that the solid adsorbent may be made of particular inorganic oxide alone or may include the inorganic oxide as a main ingredient.

In the fifteenth solution, the humidity medium absorbs moisture in such a manner that the moisture is absorbed in the liquid absorbent. Further, the humidity medium releases moisture in such a manner that the moisture is desorbed from the liquid absorbent.

In the sixteenth solution, the liquid absorbent absorbs moisture from the primary air not yet supplied to the compressor (21). This liquid absorbent is heated up into an easy-to-release condition by the high-temperature primary air compressed by the compressor (21), and then released to the secondary air. This moisture release regenerates the liquid absorbent.

In the seventeenth solution, the primary air and the liquid absorbent come into indirect contact with each other through the hydrophobic porous membrane interposed therebetween. The moisture in the primary air permeates the hydrophobic porous membrane and is then absorbed in the liquid absorbent, whereby the primary air is dehumidified.

In the eighteenth solution, the liquid absorbent is made of a water solution of hydrophilic organic compound. Examples of organic compound of this kind include ethylene glycol, glycerin and hydrophilic resin.

In the nineteenth solution, the liquid absorbent is made of a water solution of metallic halide. Examples of metallic halide of this kind include LiCl, LiBr and $CaCl_2$.

In the twentieth solution, the liquid absorbent absorbs moisture of the primary air in the moisture absorbing section (65), whereby the primary air is dehumidified. This liquid absorbent flows through the circulation circuit (64) to reach the moisture releasing section (66). In the moisture releasing section (66), the liquid absorbent releases moisture to the secondary air, so that it is regenerated and the secondary air is humidified. The regenerated liquid absorbent flows through the circulation circuit (64) to reach the moisture absorbing section (65) again, and repeats this circulation.

In the twenty-first solution, the humidity medium in the dehumidifying means releases moisture to the secondary air, so that it is regenerated and the secondary air is humidified. The humidified secondary air is then supplied to the room through the humidity adjusting means (90). During the time, part of the secondary air takes part of moisture being released by the humidity medium and is then supplied to the room as it is. On the other hand, the remaining part of the secondary air takes the remaining part of moisture being released by the humidity medium, is cooled through heat exchange with the secondary air yet to be supplied to the heat exchanger (30) so that moisture in the secondary air is removed by condensation, and is then supplied to the room. In short, only part of moisture released from the humidity medium is supplied to the room together with the secondary air.

Effects

Thus, according to the present invention, since the primary air dehumidified to or below the absolute humidity of the outside air by the dehumidifying means (55, 60) expands in the expander (22), this prevents production of water droplets or ice in the primary air at the outlet of the expander (22) and also condensation of moisture in the primary air having been blown out of the expander (22) and concurrently enables the temperature of the primary air at the outlet of the expander (22) to be set lower than the outside air temperature. Therefore, the temperature of the primary air at the inlet of the expander (22) can be set still lower. Accordingly, while the quantity of heat given to the secondary air in the heat exchanger (30) is maintained, the input to the compressor (21) can be reduced. As a result, the COP can be enhanced. And concurrently water droplets or the like can be prevented from being produced in the primary air exiting from the expander (22) thereby eliminating the need for drainage and snow removal processes. Thus, the construction of the system can be simplified.

Particularly in the second solution, an air containing an inlet air from outdoors is used as the secondary air. Since the outside air temperature during heating is generally relatively low, such a low-temperature air containing an inlet air from outdoors is supplied as the secondary air to the heat exchanger (30). Therefore, the primary air can be cooled to a low temperature in the heat exchanger (30) so that the temperature of the primary air at the inlet of the expander (22) can be set at a low temperature. As a result, while the quantity of heat given to the secondary air in the heat exchanger (30) is maintained, the input to the compressor (21) can be reduced. This further ensures enhancement in the COP. Also in this case, the primary air is dehumidified to or below the absolute humidity of the outside air by the dehumidifying means (55, 60). Therefore, a drainage process and a snow removal process can be omitted thereby simplifying the construction of the system.

Further, in the second solution, an air containing an exhaust air coming from the room is used as the primary air, while an air containing an inlet air coming from outdoors is used as the secondary air. Therefore, the room can be ventilated while air conditioned. Furthermore, since the primary air containing the exhaust air is compressed by the compressor (21) and the compressed primary air is then heat exchanged with the secondary air containing the inlet air in the heat exchanger (30), hot heat can be recovered which is contained in the exhaust air being discharged to outdoors for ventilation. As a result, energy loss involved in ventilation can be reduced.

Still further, according to the third solution, moisture removed from the primary air can be used to humidify the secondary air. This eliminates the need for supplying additional moisture for humidification of the secondary air, which provides simplified construction. In addition, when all of the moisture removed from the primary air is supplied to the secondary air, there will be no need to dispose of the moisture as a drain. This also provides simplified construction.

Still further, according to the fifth to ninth solutions, moisture in the primary air can be separated from the primary air without being condensed. Therefore, energy taken by dehumidification of the primary air can be reduced to a larger extent as compared with the case of removing moisture by condensing it. This provides enhanced energy efficiency.

Particularly according to the eighth solution, moisture in the compressed primary air can be supplied to the secondary air as it is held in a vapor state. Thus, moisture will not evaporate in the secondary air in humidifying the secondary air. Accordingly, the heating capacity can be improved by recovering energy of vapor in the primary air to the secondary air, which provides enhanced energy efficiency.

Still further, according to the ninth solution, the difference in vapor partial pressure between both sides of the separation membrane can be ensured by the pressure reducing means (60), regardless of the operating conditions. Accordingly, means for removing moisture can always separate vapor from the compressed primary air for dehumidification of the primary air.

Still further, according to the eleventh to twentieth solutions, moisture in the primary air can be continuously transferred to the secondary air by the humidity medium of the dehumidifying means (60), which enables continuous dehumidification of the primary air and continuous humidification of the secondary air. Particularly according to the twelfth to twentieth solutions, the humidity medium of the dehumidifying means (60) can be formed using the solid adsorbent or the liquid absorbent. Further, according to the thirteenth and twentieth solutions, the dehumidifying means (60) can be formed properly for each particular humidity medium.

Still further, according to the twenty-first solution, the humidity medium of the dehumidifying means (60) can supply to the room only part of moisture being released to the secondary air. The secondary air having taken the moisture from the humidity medium may have an absolute humidity higher than that of the room air. In such a case, if the secondary air is supplied to the room as it is, the room humidity may have so risen as to give an uncomfortable feeling to a person present in the room. In contrast, according to this solution, it is possible to supply to the room so much only of moisture being released by the humidity medium as is necessary to maintain the room humidity, which makes it possible to maintain the room comfortably.

BEST MODE FOR CARRYING OUT THE INVENTION

Embodiments of the present invention will be hereinafter described with reference to the drawings.

EMBODIMENT 1 OF THE INVENTION

Figure 1:
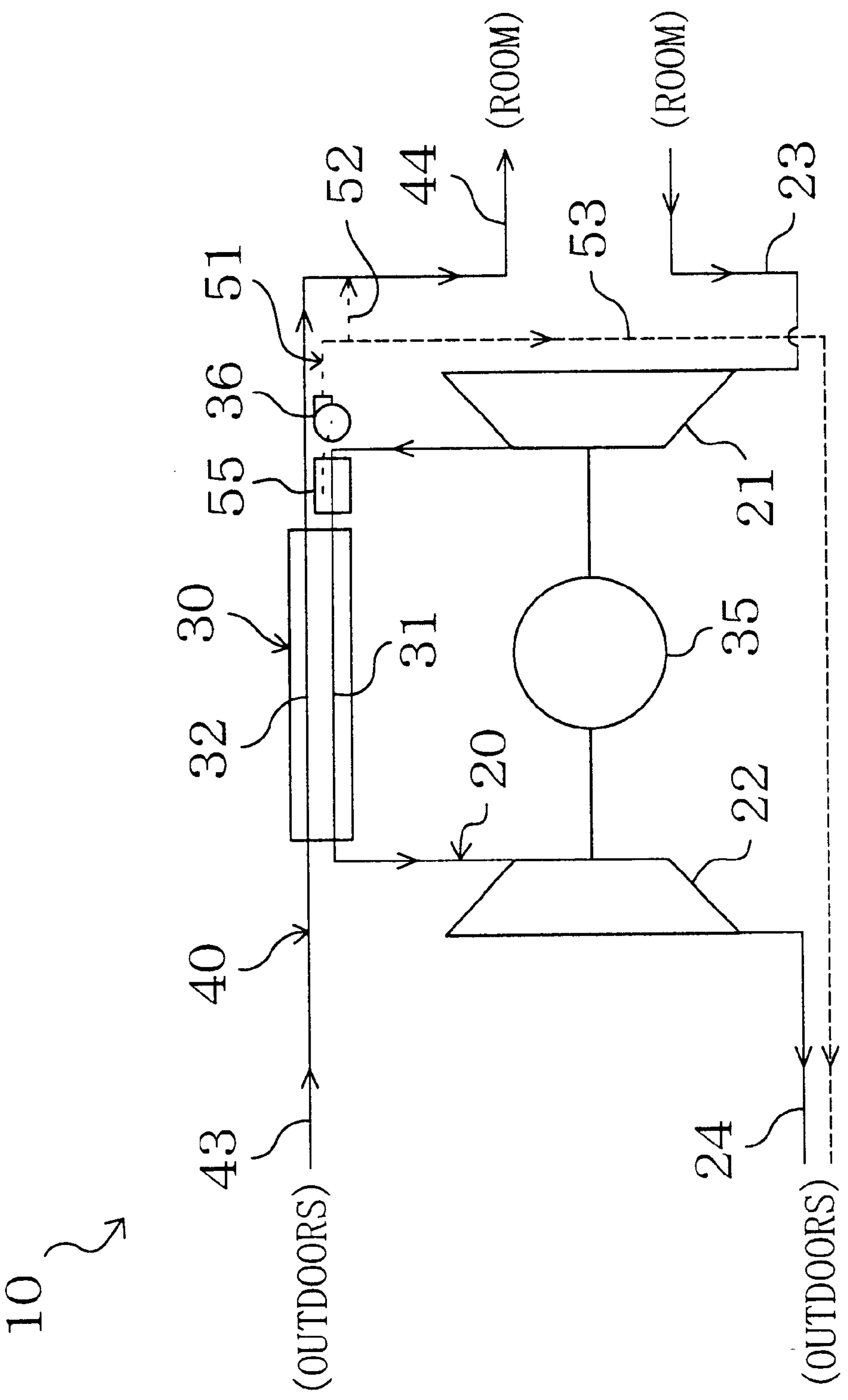
FIG. 1 is a schematic constructional diagram showing the construction of an air conditioning system according to Embodiment 1.

As shown in FIG. 1, an air conditioning system (10) of this embodiment includes a first channel (20), a second channel (40) and a vapor separator (55) as a dehumidifying means, and is configured to provide heating for a room.

The first channel (20) is formed by sequentially connecting a compressor (21), the vapor separator (55), a heat exchanger (30) and an expander (22) through ducts, and is constituted as an air cycle circuit for effecting air refrigeration cycle operation. This first channel (20) includes a first inlet duct (23) connected to the inlet side of the compressor (21), and a first outlet duct (24) connected to the outlet side of the expander (22). The first inlet duct (23) is opened at one end thereof to a room to take in a room air as the primary air. This room air taken in through the first inlet duct (23) is an exhaust air being discharged from the room for ventilation. The first outlet duct (24) is opened at one end thereof to outdoors to lead the low-temperature primary air coming from the expander (22) to outdoors.

The second channel (40) is formed by connecting a second inlet duct (43) and a second outlet duct (44) to the inlet side and outlet side of the heat exchanger (30), respectively. The second inlet duct (43) is opened at one end thereof to outdoors to take in an outside air as a secondary air. This outside air taken in through the second inlet duct (43) is an inlet air to be supplied to the room for ventilation. The second outlet duct (44) is opened at one end thereof to the room to supply the high-temperature secondary air coming from the heat exchanger (30) to the room.

The compressor (21) is connected to a motor (35). Further, the compressor (21) is also connected to the expander (22). Thus, the compressor (21) is driven by a driving force of the motor (35) and expansion work of air during expansion in the expander (22).

The heat exchanger (30) is divided into a heat release side passage (31) and a heat absorption side passage (32). The heat release side passage (31) is connected at its one end to the vapor separator (55) through a duct, is connected at the other end to the expander (22) through a duct, and allows the primary air to flow therethrough. The heat absorption side passage (32) is connected at its one end to the second inlet duct (43), is connected at the other end to the second outlet duct (44), and allows the secondary air to flow therethrough. Further, the heat exchanger (30) is arranged to provide heat exchange between the primary air in the heat release side passage (31) and the secondary air in the heat absorption side passage (32) and thereby heat the secondary air.

The vapor separator (55) includes a separation membrane and is provided with high-pressure and low-pressure spaces partitioned by the separation membrane. The high-pressure space is communicated at its entrance side with the compressor (21) and communicated at its exit side with the heat release side passage (31) of the heat exchanger (30) so that the primary air compressed by the compressor (21) flows therethrough. Further, this vapor separator (55) is arranged to effect dehumidification of the primary air in a manner that vapor in the primary air permeates the separation membrane to move from the high-pressure space to the low-pressure space. This vapor separator (55) effects dehumidification of the primary air so that the absolute humidity of the primary air is equal to or lower than that of the outside air, thereby constituting a dehumidifying means.

The separation membrane is formed of a polymer film of fluororesin or the like. Further, the separation membrane is configured so that vapor permeates therethrough by diffusion of water molecules into the membrane. This separation membrane may be formed of a porous film for gas separation made of xerogel or the like. In this case, vapor in the air permeates the separation membrane by capillary condensation and diffusion of water molecules.

The low-pressure space of the vapor separator (55) is communicated with a vacuum pump (36). This vacuum pump (36) is for reducing the pressure of the low-pressure space and constitutes a pressure reducing means for ensuring a difference in vapor partial pressure between the high-pressure and low-pressure spaces.

The outlet side of the vacuum pump (36) is connected to one end of a drain pipe (51). The other end of the drain pipe (51) is branched into a first branch pipe (52) and a second branch pipe (53). The first branch pipe (52) is connected to the second outlet duct (44) to supply part of moisture discharged from the vacuum pump (36) to the secondary air. The second branch pipe (53) extends outdoor and is open to outdoors to discharge the remaining part of moisture from the vacuum pump (36) to outdoors.

Behavior in Operation

Figure 2:
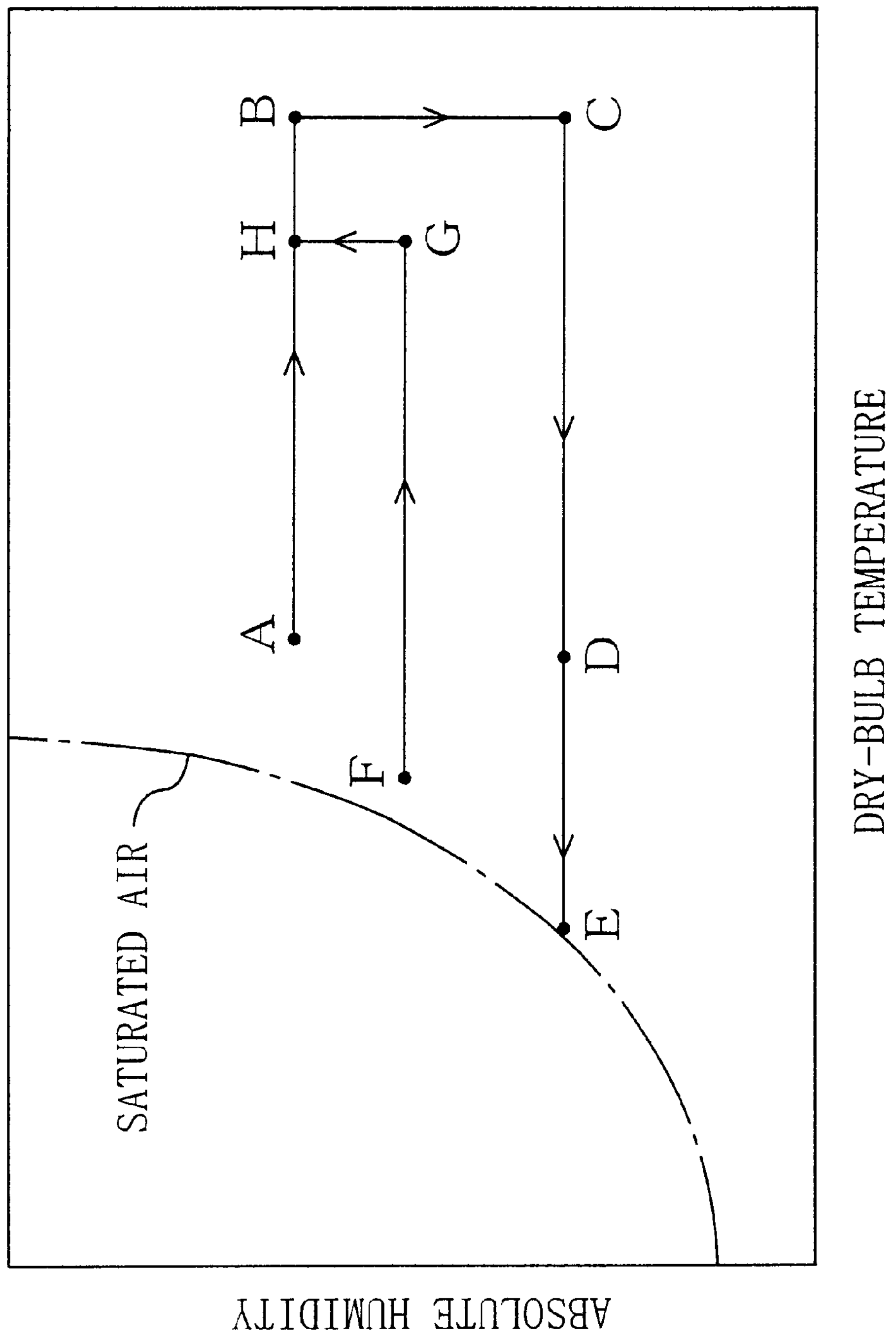
FIG. 2 is a psychrometric chart showing behavior of the air conditioning system according to Embodiment 1.

Next, behavior of the air conditioning system (10) in operation will be described with reference to the psychrometric chart of FIG. 2.

In the first channel (20), an outside air in a state of point A is taken as a primary air through the first inlet duct (23). This primary air is sucked and compressed by the compressor (21) to increase its temperature and pressure while maintaining a constant absolute humidity, so that it comes to a state of point B. The primary air in the state of point B enters the vapor separator (55) to flow through the high-pressure space. During the time, vapor in the primary air is transferred to the low-pressure space by the permeation through the separation membrane. The primary air thereby reduces its absolute humidity while maintaining the temperature constantly to come to a state of point C. In this state, the absolute humidity of the primary air is below that of the outside air.

The primary air in the state of point C enters the heat exchanger (30) to flow into the heat release side passage (31) and exchange heat with the secondary air in the heat absorption side passage (32). The primary air is cooled through this heat exchange to reduce its temperature while maintaining the constant absolute humidity, so that it comes to a state of point D. The primary air in the state of point D is expanded by the expander (22) to reduce its temperature and pressure while maintaining the constant absolute humidity, so that it comes to a state of point E. Then, the primary air in the state of point E is discharged to outdoors through the first outlet duct (24).

The vapor separated from the primary air by the vapor separator (55) flows through the vacuum pump (36) into the drain pipe (51). During the time, the vapor is condensed in part and distributed into the first branch pipe (52) and the second branch pipe (53). Moisture in a vapor state flows mainly into the first branch pipe (52) and is then supplied to the secondary air in the second outlet duct (44). Condensed moisture flows mainly into the second branch pipe (53) and is then discharged as a drain to outdoors.

In the second channel (40), an outside air in a state of point F is taken as the secondary air through the second inlet duct (43). This secondary air enters the heat exchanger (30) to flow into the heat absorption side passage (32) and exchanges heat with the primary air in the heat release side passage (31). The secondary air is heated up through this heat exchange to increase its temperature while maintaining its constant absolute humidity so that it comes to a state of point G.

The secondary air in the state of point H exits from the heat absorption side passage (32) and flows through the second outlet duct (44). During the time, the moisture in a vapor state is supplied to the secondary air in the second outlet duct (44) through the first branch pipe (52). Therefore, the secondary air in the state of point G increases its absolute humidity while maintaining its temperature constantly so that it comes to a state of point H. The secondary air in the state of point H is then supplied to the room through the second outlet duct (44).

Effects of Embodiment 1

In Embodiment 1, since an outside air is taken in as the primary air through the first inlet duct (23) and this primary air is dehumidified by the vapor separator (55), the absolute humidity of the primary air at the inlet of the expander (22) can be set lower than that of the outside air. Therefore, the temperature of the primary air at the outlet of the expander (22) can be set lower than the outside air temperature while it can be prevented that water droplets or ice are produced in the primary air. Particularly in this embodiment, only a low-temperature outside air is taken in as the secondary air through the second inlet duct (43). Therefore, in the heat exchanger (30), the primary air can be cooled down to a still lower temperature through heat exchange with the low-temperature secondary air.

Thus, according to this embodiment, the temperature of the primary air at the inlet of the expander (22) can be set still lower. This provides reduced input to the compressor (21) while maintaining the quantity of heat given to the secondary air in the heat exchanger (30). As a result, the COP can be enhanced. And concurrently water droplets or the like can be prevented from being produced in the primary air exiting from the expander (22) thereby eliminating the need for drainage and snow removal processes. Thus, the construction of the system can be simplified.

Further, since an exhaust air coming from the room is used as the primary air while an inlet air coming from outdoors is used as the secondary air, the room can be ventilated while air conditioned. Furthermore, since the primary air comprising the exhaust air is compressed by the compressor (21) and the compressed primary air is then heat exchanged with the secondary air comprising the inlet air in the heat exchanger (30), hot heat can be recovered which is contained in the exhaust air being discharged to outdoors for ventilation. As a result, energy loss involved in ventilation can be reduced.

Still further, moisture removed from the primary air in the vapor separator (55) can be used to humidify the secondary air. This eliminates the need for supplying additional moisture for humidification of the secondary air, which provides simplified construction.

Still further, since in the vapor separator (55), the separation membrane is used to separate vapor from the primary air, moisture in the primary air can be separated from the primary air without being condensed. Therefore, energy taken by dehumidification of the primary air can be reduced to a larger extent as compared with the case of removing moisture by condensing it. This provides enhanced energy efficiency.

Still further, since the low-pressure space of the vapor separator (55) is reduced in pressure by the vacuum pump (36), the difference in vapor partial pressure between both sides of the separation membrane of the vapor separator (55) can be ensured regardless of the operating conditions. As a result, it is ensured that dehumidification of the primary air is always effected in the vapor separator (55).

Modified Example of Embodiment 1

In the above embodiment, the low-pressure space of the vapor separator (55) is reduced in pressure by the vacuum pump (36) so that vapor is separated from the primary air in the vapor separator (55). Alternatively, the vapor separator (55) may be changed in construction without the provision of the vacuum pump (36). For example, the vapor separator (55) may be configured so that vapor in the primary air moves to the secondary air by the permeation through the separation membrane.

Specifically, the vapor separator of this modified example is formed with first and second spaces partitioned by the separation membrane. The first space is communicated with a portion of the first channel (20) located between the compressor (21) and the heat exchanger (30). The primary air coming from the compressor (21) flows through the first space. The second space is communicated with a halfway portion of the second inlet duct (43) of the second channel (40). The secondary air coming from the heat exchanger (30) flows through the second space. Vapor in the primary air permeates the separation membrane by a difference in vapor partial pressure between the first and second spaces to move to the secondary air, and the separated vapor is then supplied together with the secondary air to the room so as to be used to humidify the room.

According to this modified example, moisture in the compressed primary air can be supplied to the secondary air as it is held in a vapor state. Thus, moisture will not evaporate in the secondary air in humidifying the secondary air. Accordingly, the heating capacity can be improved by recovering energy of vapor in the primary air to the secondary air, which provides enhanced energy efficiency.

EMBODIMENT 2 OF THE INVENTION

In Embodiment 2 of the present invention, a dehumidifying mechanism (60) is provided as a dehumidifying means instead of the vapor separator (55) in Embodiment 1. Other structures are the same as in Embodiment 1, and therefore the following description will be made about structures different from Embodiment 1.

Figure 3:
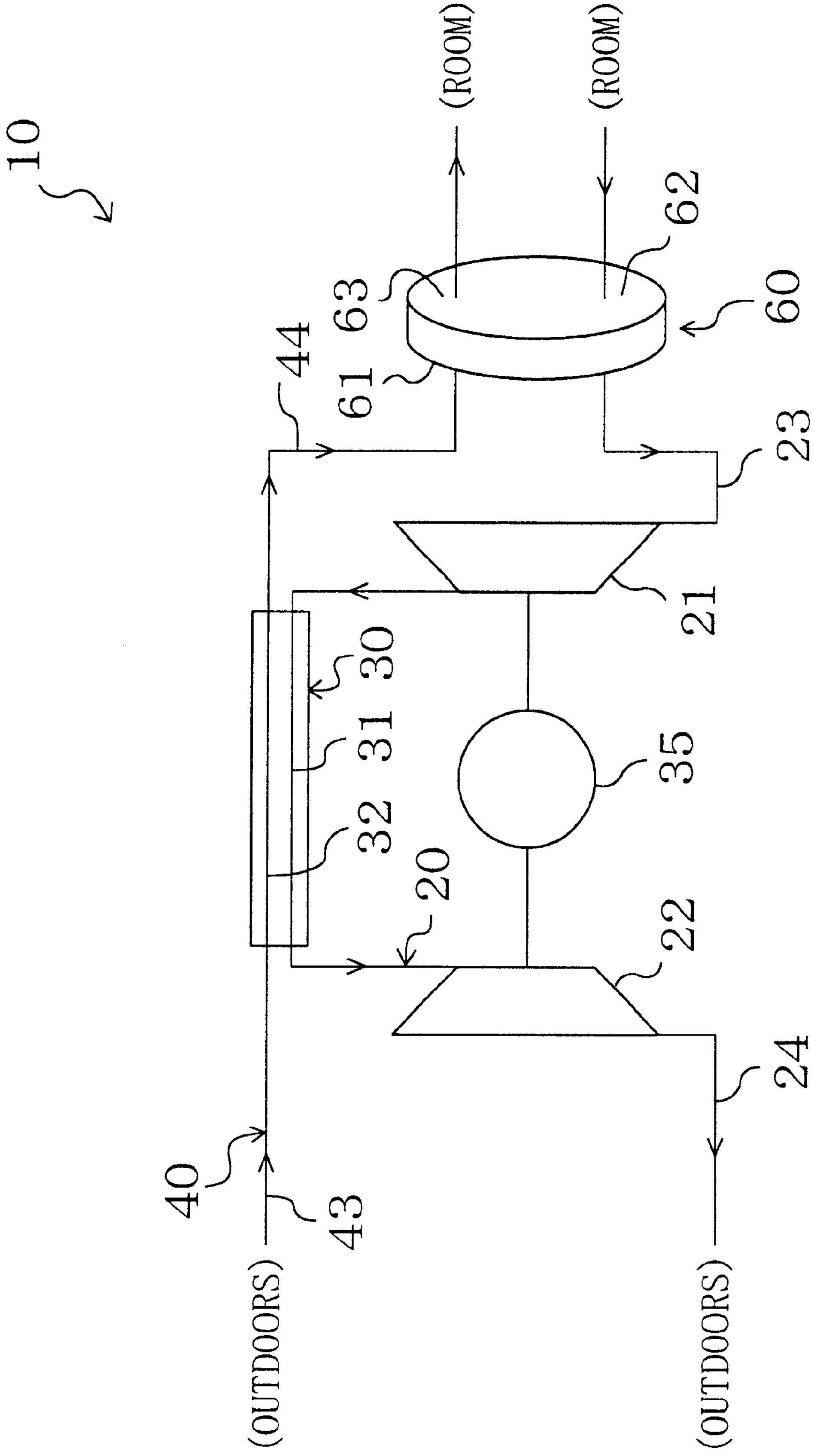
FIG. 3 is a schematic constructional diagram showing the construction of an air conditioning system according to Embodiment 2.

As shown in FIG. 3, the dehumidifying mechanism (60) is provided partway in the first inlet duct (23) and the second outlet duct (44). This dehumidifying mechanism (60) includes a rotor member (61), a moisture absorbing section (62) and a moisture releasing section (63), and is constructed like a so-called rotary-type dehumidifier.

The rotor member (61) has the shape of a disc and is formed to permeate air in the direction of its thickness. This rotor member (61) includes a moisture-adsorbable solid adsorbent and constitutes a humidity medium for contacting air passing through it with the solid adsorbent. In addition, the rotor member (61) is connected to a drive motor as a drive mechanism, which is not shown, and rotatively driven by the drive motor to move between the moisture absorbing section (62) and the moisture releasing section (63). The solid adsorbent in the rotor member (61) is made essentially of porous inorganic compound. As this porous inorganic compound, the compound which has a pore diameter in the order of 0.1 nm to 20 nm and adsorbs moisture may be selected.

The moisture absorbing section (62) is placed partway in the first inlet duct (23). In the moisture absorbing section (62), the primary air in the first inlet duct (23) passes through the rotor member (61) so that moisture in the primary air is adsorbed on the solid adsorbent of the rotor member (61). The primary air is thereby dehumidified.

The moisture releasing section (63) is placed partway in the second outlet duct (44). In the moisture releasing section (63), the secondary air in the second outlet duct (44) passes through the rotor member (61) so that moisture adsorbed on the solid adsorbent of the rotor member (61) is desorbed and released into the secondary air. Thereby, the solid adsorbent is regenerated and the secondary air is humidified.

As described above, the rotor member (61) is driven by the drive motor to move between the moisture absorbing section (62) and the moisture releasing section (63). Specifically, a portion of the rotor member (61) which has taken up moisture from the primary air in the moisture absorbing section (62) moves to the moisture releasing section (63) with the rotation of the rotor member (61). In the moisture releasing section (63), the moisture is desorbed from the solid adsorbent of the rotor member (61) so that the solid adsorbent is regenerated. Namely, the rotor member (61) releases the moisture to the secondary air. Thereafter, the regenerated portion of the rotor member (61) moves to the moisture absorbing section (62) again. The dehumidifying mechanism (60) continuously dehumidifies the primary air and humidifies the secondary air by repeating the above actions.

Behavior in Operation

Figure 4:
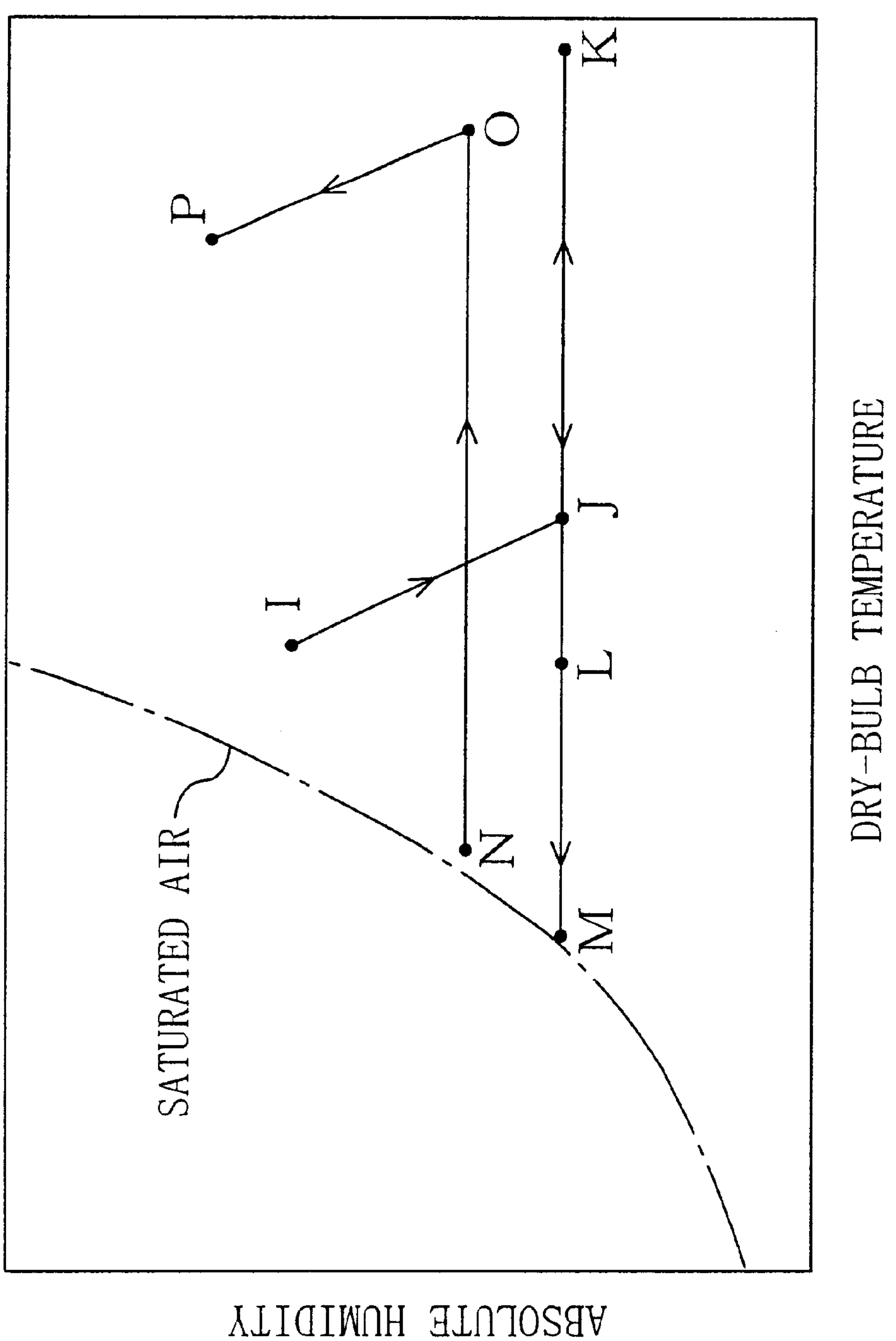
FIG. 4 is a psychrometric chart showing behavior of the air conditioning system according to Embodiment 2.

Next, behavior of the air conditioning system (10) in operation will be described with reference to the psychrometric chart of FIG. 4.

In the first channel (20), a room air in a state of point I is taken as a primary air through the first inlet to duct (23). This primary air is dehumidified through contact with the rotor member (61) in the moisture absorbing section (62) of the dehumidifying mechanism (60) to reduce its absolute humidity and increase its temperature by an isenthalpic change, so that it changes from the state of point I to a state of point J along an isenthalpic line. In this state, the absolute humidity of the primary air is lower than that of the outside air.

The primary air in the state of point J is compressed by the compressor (21) to increase its temperature and pressure while maintaining a constant absolute humidity, so that it comes to a state of point K. The primary air in the state of point K enters the heat exchanger (30) to flow into the heat release side passage (31) and exchanges heat with a secondary air in the heat absorption side passage (32). The primary air is cooled through this heat exchange to reduce its temperature while maintaining the constant absolute humidity, so that it comes to a state of point L. The primary air in the state of point L is expanded by the expander (22) to reduce its temperature and pressure while maintaining the constant absolute humidity, so that it comes to a state of point M. Then, the primary air in the state of point M is discharged to outdoors through the first outlet duct (24).

In the second channel (40), an outside air in a state of point N is taken as the secondary air through the second inlet duct (43). The secondary air in the state of point N enters the heat exchanger (30) to flow into the heat absorption side passage (32). During the time, this secondary air exchanges heat with the primary air in the heat release side passage (31) to increase its temperature while maintaining the constant absolute humidity, so that it comes to a state of point O.

The secondary air in the state of point O enters the moisture releasing section (63) of the dehumidifying mechanism (60) through the second outlet duct (44). In the moisture releasing section (63), the secondary air contacts the rotor member (61) so that the rotor member (61) releases moisture to the secondary air. The secondary air thus increases its absolute humidity and reduces its temperature by an isenthalpic change so that it changes from the state of point O to a state of point P along an isenthalpic line. The secondary air in the state of point P is supplied to the room through the second outlet duct (44).

In the dehumidifying mechanism (60), the rotor member (61) is driven into rotation. This rotor member (61) thereby moves between the moisture absorbing section (62) and the moisture releasing section (63) to repeat moisture absorption in the moisture absorbing section (62) and moisture release in the moisture releasing section (63). This provides continuous dehumidification of the primary air and continuous humidification of the secondary air.

Effects of Embodiment 2

According to Embodiment 2, since the primary air dehumidified by the dehumidifying mechanism (60) is supplied to the compressor (21), the effects resulting from dehumidifying the primary air before it arrives at the expander (22) can be obtained like Embodiment 1.

Modified Example of Embodiment 2

In the above embodiment, the dehumidifying mechanism (60) is formed by using the solid adsorbent. The dehumidifying mechanism (60) may be formed by using a liquid absorbent instead.

Figure 5:
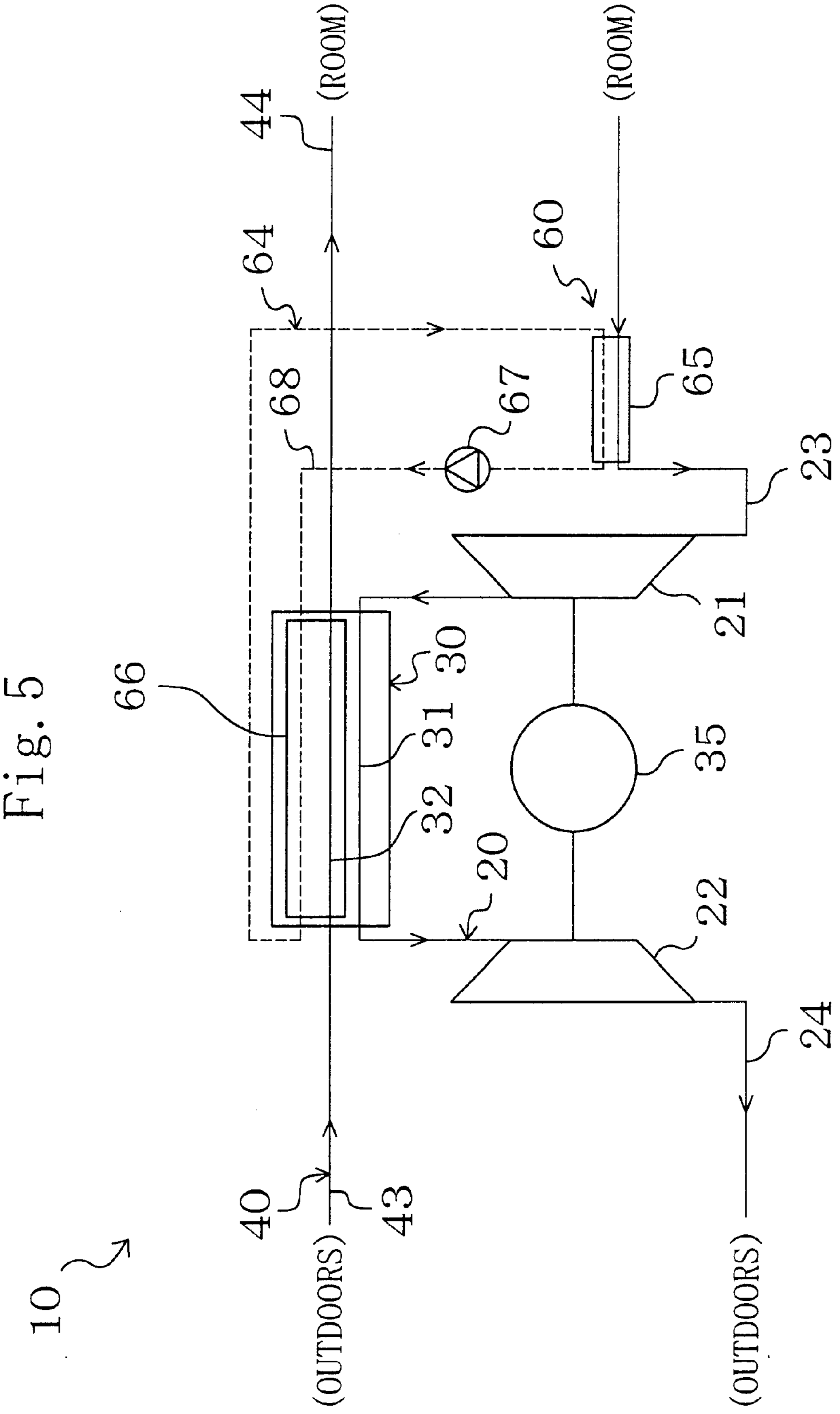
FIG. 5 is a schematic constructional diagram showing the construction of an air conditioning system according to a modified example of Embodiment 2.

As shown in FIG. 5, the dehumidifying mechanism (60) using a liquid absorbent consists of a circulation circuit (64) formed by sequentially connecting a moisture absorbing section (65), a moisture releasing section (66) and a pump (67) through liquid piping (68). The circulation circuit (64) is filled with a water solution of metallic halide as the liquid absorbent. Examples of metallic halide of this kind include LiCl, LiBr and $CaCl_2$. The liquid absorbent may be a water solution of hydrophilic organic compound. Examples of organic compound of this kind include ethylene glycol, glycerin and hydrophilic resin.

The moisture absorbing section (65) is placed partway in the first inlet duct (23). The moisture absorbing section (65) is provided with a hydrophobic porous membrane capable of permeating moisture, and divided into air side and liquid side spaces by the hydrophobic porous membrane. The air side space is communicated with the first inlet duct (23) so that the primary air flows therethrough. The liquid side space is communicated with the liquid piping (68) so that the liquid absorbent flows therethrough. In the moisture absorbing section (65), the primary air in the air side space indirectly contacts the liquid absorbent in the liquid side space through the hydrophobic porous membrane so that moisture contained in the primary air is absorbed in the liquid absorbent after the permeation through the hydrophobic porous membrane. In this manner, the moisture absorbing section (65) effects dehumidification of the primary air.

The moisture releasing section (66) is disposed in the heat exchanger (30). The moisture releasing section (66) is provided with a hydrophobic porous membrane capable of permeating moisture, wherein a liquid side space is formed on one side of the hydrophobic porous membrane and the side of the hydrophobic porous membrane opposite to the liquid side space constitutes the heat absorption side passage (32) of the heat exchanger (30). The liquid side space is communicated with the liquid piping (68) so that the liquid absorbent flows therethrough. In the moisture releasing section (66), the liquid absorbent in the liquid side space is heated up through heat exchange with the secondary air in the heat absorption side passage (32), and at the same time the liquid absorbent in the liquid side space indirectly contacts the secondary air in the heat absorption side passage (32) through the hydrophobic porous membrane so that moisture contained in the liquid absorbent is supplied to the secondary air by the permeation through the hydrophobic porous membrane. In this manner, in the moisture releasing section (66), the liquid absorbent releases moisture to the secondary air.

In the. circulation circuit (64), the liquid absorbent circulates by means of the pump (67) so that dehumidification of the primary air is continuously made. Specifically, the liquid absorbent absorbs moisture of the primary air in the moisture absorbing section (65), and flows through the liquid piping (68) into the moisture releasing section (66). In the moisture releasing section (66), the liquid absorbent is heated up and releases moisture to the secondary air. The liquid absorbent is thereby regenerated. The regenerated liquid absorbent flows through the liquid piping (68) into the moisture absorbing section (65). The liquid absorbent repeats this circulation.

EMBODIMENT 3 OF THE INVENTION

Embodiment 3 of the present invention is constructed so that in Embodiment 2, a humidity adjustor (91) is provided and the construction of the dehumidifying mechanism (60) is changed. The following description will be made about structures different from Embodiment 2.

Figure 6:
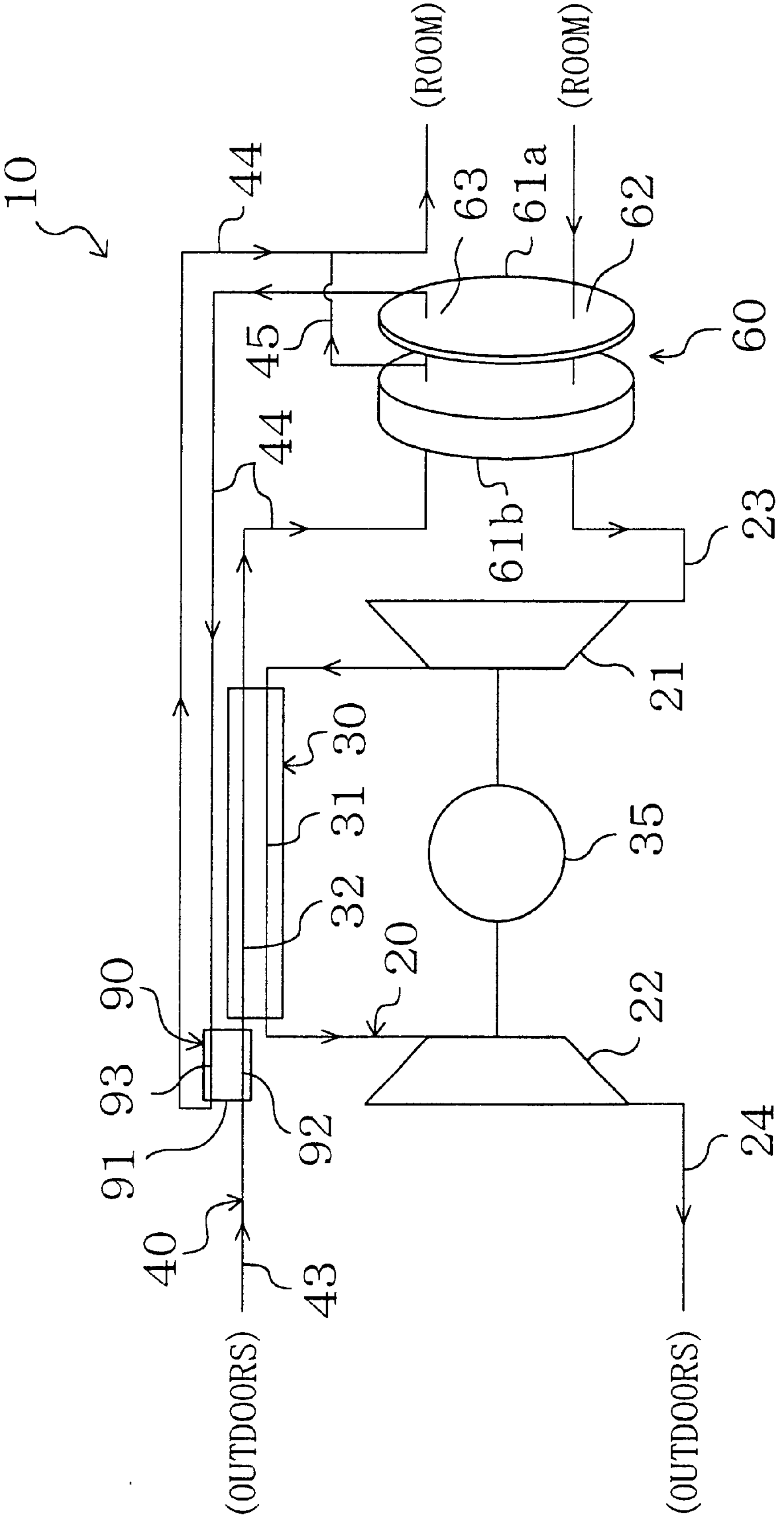
FIG. 6 is a schematic constructional diagram showing the construction of an air conditioning system according to Embodiment 3.

As shown in FIG. 6, the humidity adjustor (91) is divided into a low-temperature side passage (92) and a high-temperature side passage (93). The low-temperature side passage (92) is connected to a halfway portion of the second inlet duct (43). A low-temperature outside air taken in as a secondary air through the second inlet duct (43) flows through the low-temperature side passage (92). The high-temperature side passage (93) is connected to a portion of the second outlet duct (44) of the second channel (40) located downstream of the dehumidifying mechanism (60). Part of the secondary air humidified in moisture releasing section (63) of the dehumidifying mechanism (60) is supplied to the high-temperature side passage (93).

In the humidity adjustor (91), the secondary air of low temperature in the low-temperature side passage (92) are heat exchanged with the secondary air of high temperature and high humidity in the high-temperature side passage (93), so that the secondary air in the high-temperature side passage (93) is cooled and vapor in the secondary air is partially condensed. Further, the humidity adjustor (91) is arranged to control the humidity of the secondary air in the high-temperature side passage (93) so that the absolute humidity of the secondary air therein becomes equal to that of the room air.

The dehumidifying mechanism (60) of this embodiment is constructed like a so-called rotary-type dehumidifier. This point is the same as in Embodiment 2. However, the dehumidifying mechanism (60) of this embodiment includes a first rotor member **(61*a*) and a second rotor member (61*b*)**.

Though the first and second rotor members **(61*a*, 61*b*) are formed like the rotor member (61) of Embodiment 2, the first rotor member (61*a*) is formed in a disc slightly thinner than that of the second rotor member (61*b*). The first and second rotor members (61*a*, 61*b*) are disposed so that the first rotor member (61*a*) is placed upstream of the second one in the first inlet duct (23) while the second rotor member (61*b*) is placed downstream of the first one therein and that the second rotor member (61*b*) is placed upstream of the first one in the second outlet duct (44) while the first rotor member (61*a*)** is placed downstream of the second one therein.

The first and second rotor member **(61*a*, 61*b*) are connected to a drive motor as a drive mechanism, and rotatively driven by the drive motor to move between the moisture absorbing section (62) and the moisture releasing section (63)**. This point is the same as in Embodiment 2.

Since the humidifying mechanism (60) is provided with two rotor members **(61*a*, 61*b*), the moisture absorbing section (62) and the moisture releasing section (63) are arranged in the following manners. Specifically, in this embodiment, the moisture absorbing section (62) is arranged so that the primary air coming from the first inlet duct (23) passes through the first and second rotor members (61*a*, 61*b*). On the other hand, the moisture releasing section (63) is arranged so that the secondary air coming from the second outlet duct (44) passes through the first and second rotor members (61*a*, 61*b*)**.

In the moisture releasing section (63), one end of a branch duct (45) is connected between the first rotor member **(61*a*) and the second rotor member (61*b*). The other end of the branch duct (45) is connected to a portion of the second outlet duct (44) downstream of the humidity adjustor (91). The branch duct (45) is arranged so that part of the secondary air having passed through the second rotor member (61*b*) in the moisture releasing section (63) flows through the branch duct (45) so as to bypass the first rotor member (61*a*). The branch duct (45) and the humidity adjustor (91) constitute a humidity adjusting means (90)**.

Behavior in Operation

Figure 7:
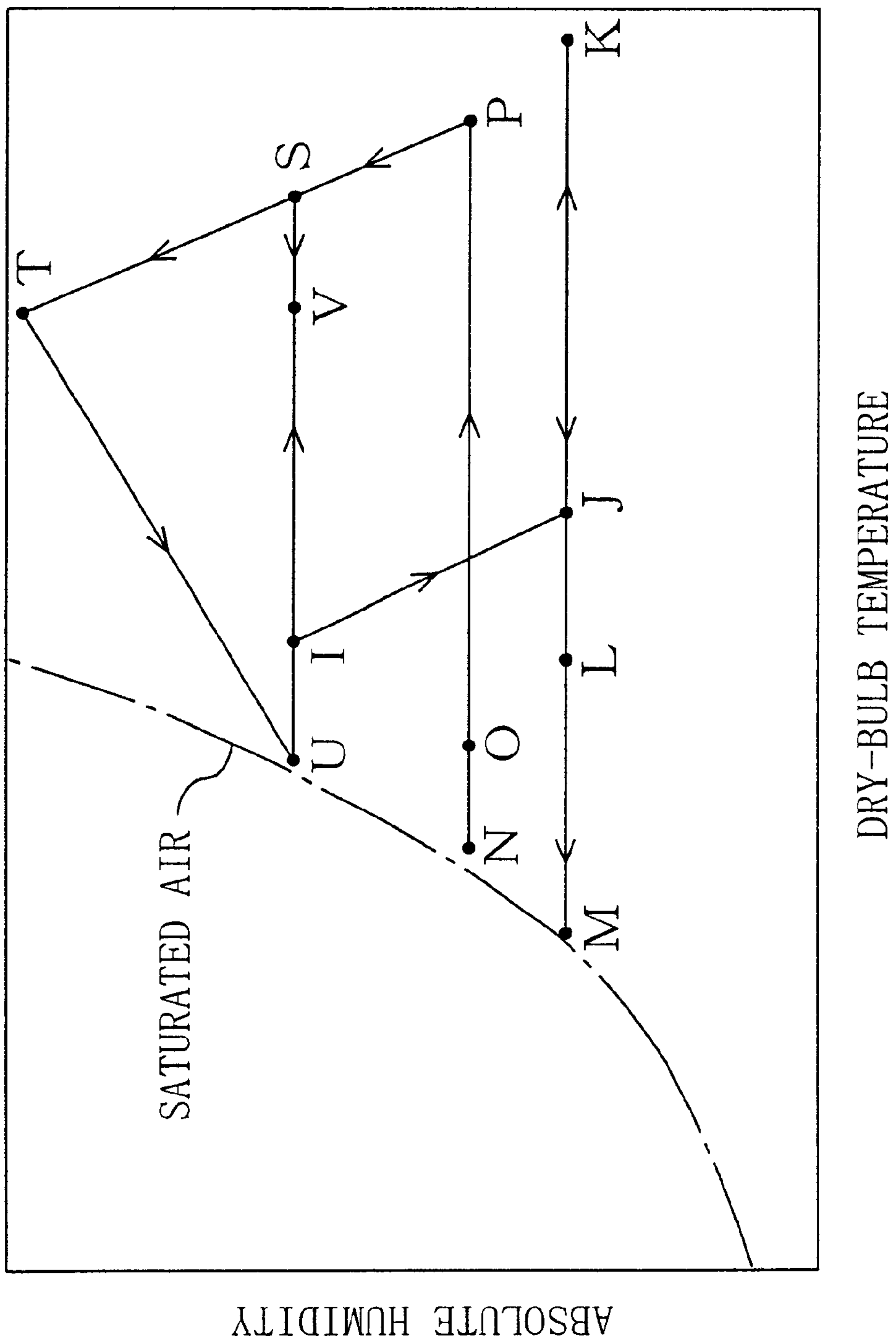
FIG. 7 is a psychrometric chart showing behavior of the air conditioning system according to Embodiment 3.

Next, behavior of the air conditioning system (10) in operation will be described with reference to the psychrometric chart of FIG. 7. It is to be noted that behavior of the first channel (20) is the same as in Embodiment 2 and therefore the description thereof will be omitted.

In the second channel (40), an outside air in a state of point N is taken as the secondary air through the second inlet duct (43). This secondary air flows through the low-temperature side passage (92) of the humidity adjustor (91) and exchanged heat with the air in the high-temperature side passage (93), so that it comes to a state of point O. The secondary air in the state of point O enters the heat exchanger (30) to flow into the heat absorption side passage (32), and exchanges heat with the primary air in the heat release side passage (31), so that it comes to a state of point P. The behavior of the second channel (40) described so far is the same as in Embodiment 2.

The secondary air in the state of point P enters the moisture releasing section (63) of the dehumidifying mechanism (60) through the second outlet duct (44). In the moisture releasing section (63), the secondary air contacts the second rotor member **(61*b*) so that the second rotor member (61*b*)** releases moisture to the secondary air. The secondary air increases its absolute humidity and reduces its temperature by an isenthalpic change so that it changes from the state of point P to a state of point S along an isenthalpic line. In the state of point S, the absolute humidity of the secondary air is equal to that of the room air in the state of point I.

The secondary air in the state of point S is distributed so that part thereof flows into the branch duct (45) and the remaining part flows into the first rotor member **(61*a*) . At the time, major part of the secondary air is distributed to the branch duct (45) so that the flow rate of the secondary air flowing toward the branch duct (45) is higher than that of the secondary air flowing toward the first rotor member (61_a_)**.

The part of the secondary air having flowed toward the first rotor member (61_a_) contacts the first rotor member (61_a_) so that the first rotor member (61_a_) releases moisture to the secondary air. This part of the secondary air increases its absolute humidity and reduces its temperature by an isenthalpic change so that it changes from the state of point S to a state of point T along an isenthalpic line. The secondary air in the state of point T enters the high-temperature side passage (93) of the humidity adjustor (91) through the second outlet duct (44).

In the humidity adjustor (91), the secondary air in the state of point T having entered the high-temperature side passage (93) is cooled through heat exchange with the secondary air in the state of point N having entered the low-temperature side passage (92). In the high-temperature side passage (93), vapor in the secondary air is condensed so that the secondary air reduces its temperature and humidity. As a result, the secondary air comes to a state of point U. In the state of point U, the absolute humidity of the secondary air is equal to that of the room air in the state of point I and the temperature of the secondary air is lower than that of the room air in the state of point I.

The secondary air in the state of point U flows through the second outlet duct (44) and then merges with the secondary air coming from the branch duct (45). Therefore, the secondary air in the state of point U coming from the humidity control section is mixed with the secondary air in the state of point S coming from the branch duct (45) so that it comes to a state of point V. Then, the secondary air in the state of point V, which is equal in absolute humidity to the room air, is supplied to the room through the second outlet duct (44).

In the dehumidifying mechanism (60), the first and second rotor members (61_a_, 61_b_) are driven into rotation.

Both the rotor members (61_a_, 61_b_) thereby move between the moisture absorbing section (62) and the moisture releasing section (63) to repeat moisture absorption in the moisture absorbing section (62) and moisture release in the moisture releasing section (63). This provides continuous dehumidification of the primary air and continuous humidification of the secondary air.

Effects of Embodiment 3

According to Embodiment 3, since the primary air dehumidified by the dehumidifying mechanism (60) is supplied to the compressor (21), the effects resulting from dehumidifying the primary air before it arrives at the expander (22) can be obtained like Embodiment 1.

Further, only part of moisture being released to the secondary air by both the rotor members (61_a_, 61_b_) of the dehumidifying mechanism (60) can be supplied to the room together with the secondary air. If all of the moisture being released by both the rotor members (61_a_, 61_b_) is supplied to the room, the room humidity may have so risen as to give an uncomfortable feeling to a person present in the room. In contrast, according to this embodiment, some of the secondary air having reached an absolute humidity equal to that of the room air through contact with the second rotary member (61_b_) is distributed to the branch duct (45), while the rest is contacted with the first rotor member (61_a_) and then dehumidified in the humidity adjustor (91) to have an absolute humidity equal to that of the room air. As a result, the secondary air having reached the absolute humidity equal to that of the room air can be supplied to the room. So much only of moisture being released as is necessary to maintain the room humidity can be thus supplied to the room, which makes it possible to maintain the room comfortably.

Modified Example of Embodiment 3

Figure 8:
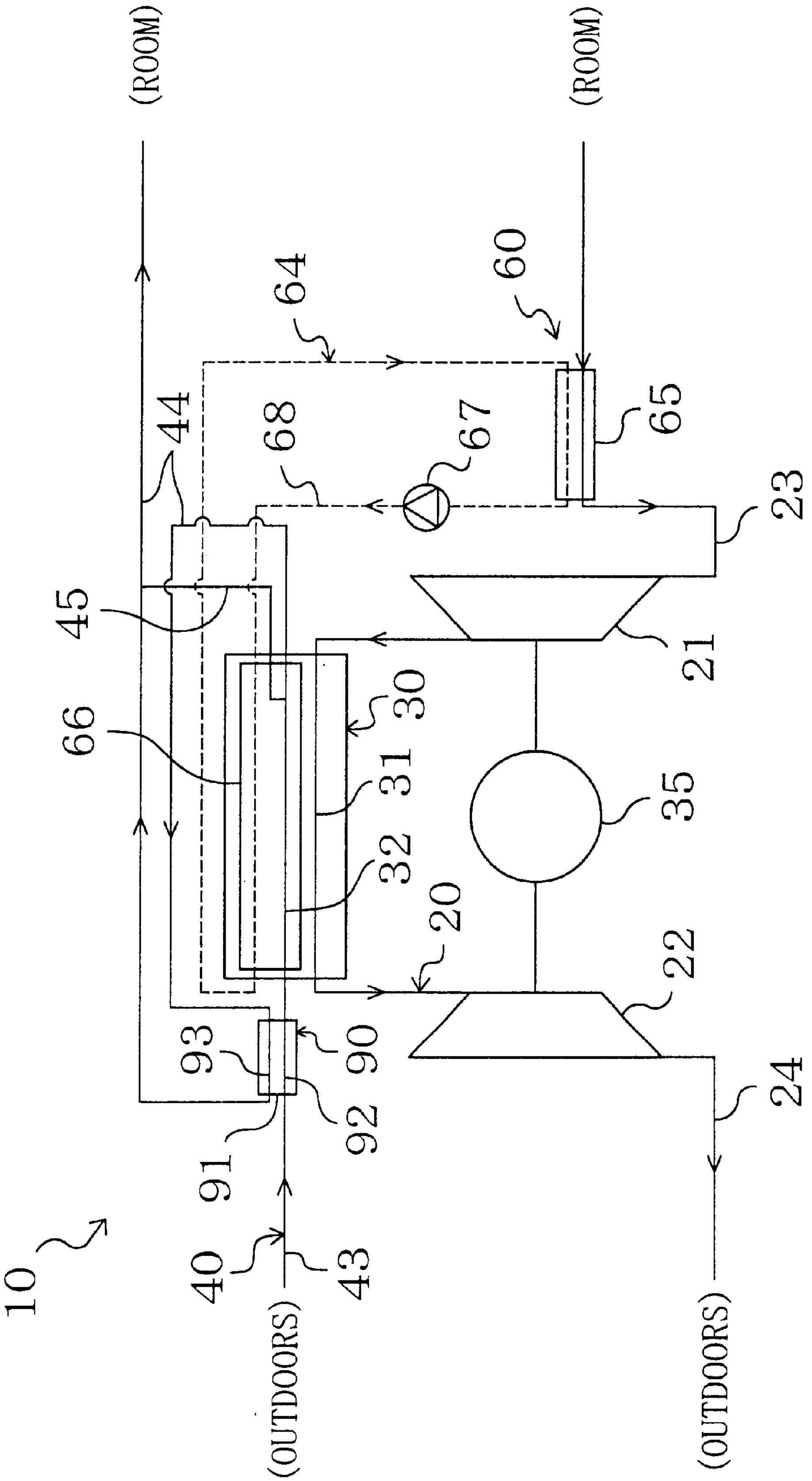
FIG. 8 is a schematic constructional diagram showing the construction of an air conditioning system according to a modified example of Embodiment 3.
Figure 9:
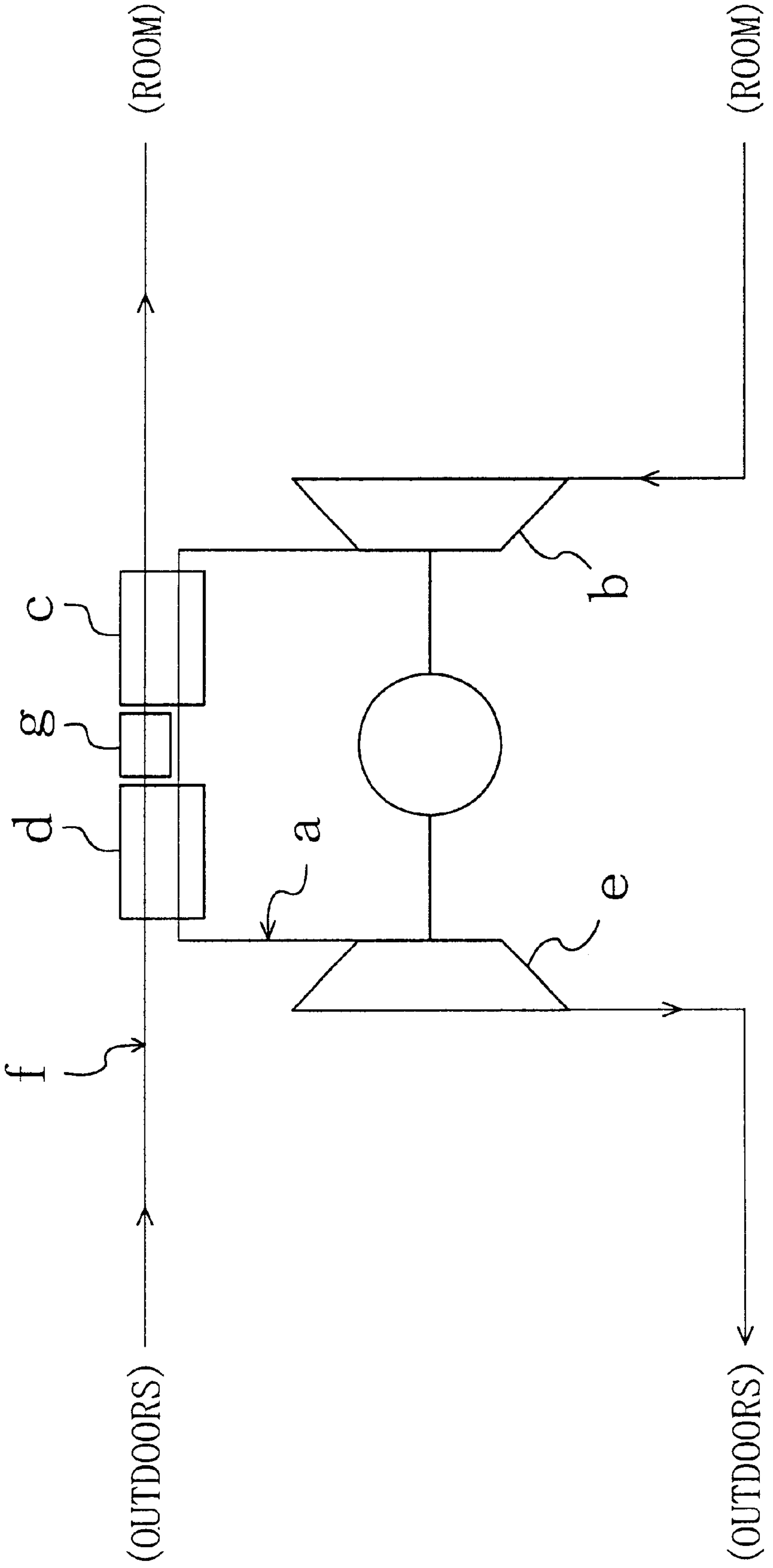
FIG. 9 is a schematic constructional diagram showing the construction of a heating system for using a conventional air cycle to effect a heat pump operation.

In the above embodiment, the dehumidifying mechanism (60) is formed by using the solid adsorbent. The dehumidifying mechanism (60) may be formed by using a liquid absorbent instead. As shown in FIG. 8, in this modified example, the dehumidifying mechanism (60) using a liquid absorbent is arranged like the modified example of Embodiment 2. Further, one end of the branch duct (45) is connected to a halfway portion of the heat absorption side passage (32) in the moisture releasing section (66). The branch duct (45) is arranged to shunt part of the secondary air in the heat absorption side passage (32) and merge it with the remaining part thereof downstream of the humidity adjustor (91) in the second outlet duct (44). Other structures are the same as in Embodiment 2.

OTHER EMBODIMENTS OF THE INVENTION

First Modification

In each of the above embodiments, a heating operation is effected by taking a room air as the primary air into the first channel (20) while taking an outside air as the secondary air into the second channel (40). In the present invention, however, a heating operation may be effected in the following manners.

A room air may be taken in as the primary air through the first inlet duct (23) of the first channel (20) and discharged to outdoors through the first outlet duct (24), while a mixed air of room and outside airs may be taken in as the secondary air through the second inlet duct (43) of the second channel (40) and supplied to a room through the second outlet duct (44).

Alternatively, a mixed air of room and outside airs may be taken in as the primary air through the first inlet duct (23) of the first channel (20) and discharged to outdoors through the first outlet duct (24), while an outside air may be taken in as the secondary air through the second inlet duct (43) of the second channel (40) and supplied to a room through the second outlet duct (44).

Alternatively, a mixed air of room and outside airs may be taken in as the primary air through the first inlet duct (23) of the first channel (20) and discharged to outdoors through the first outlet duct (24), while another mixed air of room and outside airs may be taken in as the secondary air through the second inlet duct (43) of the second channel (40) and supplied to a room through the second outlet duct (44).

It is to be noted that even when a mixed air of room and outside airs is taken in as the primary air through the first inlet duct (23), the primary air is dehumidified by the vapor separator (55) or the dehumidifying mechanism (60) to reach the absolute humidity of the outside air or below.

Second Modification

In each of the above embodiments, only the secondary air is supplied to the room through the second outlet duct (44). In this case, the temperature of the secondary air at the outlet of the expander (22) may reach a considerably high temperature depending upon the operating conditions. In this state, if the high-temperature secondary air is supplied to the room as it is, a person present in the room may have an uncomfortable feeling. Therefore, when the secondary air coming from the expander (22) is at a high temperature, the secondary air may be mixed in advance with the room air to reduce its temperature to some extent and then supplied to the room.

INDUSTRIAL APPLICABILITY

As can be seen form the above, the air conditioning system according to the present invention is useful for heating a room, and particularly suitable for providing air conditioning in an air cycle.

What is claimed is:

1. An air conditioning system that is comprised of an air cycle circuit (20) through which a primary air flows and configured to provide heating for a room by supplying a heated secondary air being heated through heat exchange with the primary air to the room, and the air cycle circuit (20) includes;

a compressor (21), wherein the primary air is sucked and compressed; a heat exchanger (30), wherein the primary air being compressed by the compressor (21) exchanges heat with the secondary air; and an expander (22), wherein the primary air being exchanged with the secondary air in the heat exchanger (30) is expanded, the system further comprising dehumidifying means (55, 60) for dehumidifying the primary air so that the absolute humidity of the primary air is equal to or below the absolute humidity of an outside air, the dehumidifying means (55, 60) being disposed in a portion of the air cycle circuit (20) upstream of the expander (22).

2. The air conditioning system of claim 1, wherein the primary air is an exhaust air being discharged from the room to outdoors or a mixed air of the exhaust air and an outside air and is discharged to outdoors through the expander (22), while the secondary air is an inlet air being supplied from outdoors to the room or a mixed air of the inlet air and a room air and is supplied to the room through the dehumidifying means (55, 60).

3. The air conditioning system of claim 2, wherein the dehumidifying means (55, 60) is arranged to supply to the secondary air moisture having been removed from the primary air.

4. The air conditioning system of any one of claims 1 to 3, wherein the dehumidifying means (55) is disposed in a portion of the air cycle circuit (20) located between the compressor (21) and the expander (22) and arranged to dehumidify the primary air compressed by the compressor (21).

5. The air conditioning system of claim 4, wherein the dehumidifying means (55) includes a separation membrane configured so that vapor in the air is permeable from higher side to lower side in vapor partial pressure of the separation membrane, and is arranged to separate vapor from the primary air without condensation.

6. The air conditioning system of claim 5, wherein the separation membrane is formed of a polymer film and configured so that vapor permeates therethrough by diffusion of water molecules into the membrane.

7. The air conditioning system of claim 5, wherein the separation membrane has a large number of pores of substantially the same size as a free path of molecules and configured so that vapor permeates therethrough by capillary condensation and diffusion of water molecules.

8. The air conditioning system of claim 5, wherein the dehumidifying means (55) is arranged to contact one surface of the separation membrane with the compressed primary air and contact the other surface thereof with the secondary air to transfer vapor in the primary air to the secondary air.

9. The air conditioning system of claim 5, further comprising pressure reducing means (36) for reducing the pressure of one side of the separation membrane of the dehumidifying means (55) to ensure a difference in vapor partial pressure between both sides of the separation membrane.

10. The air conditioning system of any one of claims 1 to 3, wherein the dehumidifying means (55) is disposed in a portion of the air cycle circuit (20) upstream of the compressor (21) and arranged to dehumidify the primary air to be supplied to the compressor (21).

11. The air conditioning system of claim 10, wherein the dehumidifying means (60) includes a humidity medium for absorbing and releasing moisture through contact with an air and arranged to allow the humidity medium to absorb moisture in the primary air to be supplied to the compressor (21) while releasing the moisture therein to the secondary air thereby continuously dehumidifying the primary air.

12. The air conditioning system of claim 11, wherein the humidity medium of the dehumidifying means (60) comprises a solid adsorbent for adsorbing moisture.

13. The air conditioning system of claim 12, wherein the humidity medium of the dehumidifying means (60) is formed of a rotor member (61) that is formed in the shape of a disc to allow air passage in a direction of its thickness and provides contact of the passing air with the solid adsorbent, and the dehumidifying means (60) comprises a moisture absorbing section (62) where the rotor member (61) absorbs moisture in the primary air through contact with the primary air, a moisture releasing section (63) where the rotor member (61) releases moisture therein to the secondary air through contact with the secondary air, and a drive mechanism for rotatively driving the rotor member (61) to allow the rotor member (61) to move between the moisture absorbing section (62) and the moisture releasing section (63).

14. The air conditioning system of claim 12, wherein the solid adsorbent is made of porous inorganic oxide.

15. The air conditioning system of claim 11, wherein the humidity medium of the dehumidifying means (60) comprises a liquid absorbent for absorbing moisture.

16. The air conditioning system of claim 11, wherein the humidity medium of the dehumidifying means (60) comprises a liquid absorbent for absorbing moisture, and the dehumidifying means (60) is arranged so that the liquid absorbent is heated by the primary air coming from the compressor (21) to release moisture having absorbed from the primary air to the secondary air.

17. The air conditioning system of claim 15 or 16, wherein the dehumidifying means (60) includes a moisture-permeable, hydrophobic porous membrane and is arranged to contact the liquid absorbent with the primary air through the hydrophobic porous membrane.

18. The air conditioning system of claim 15 or 16, wherein the liquid absorbent is made of a water solution of hydrophilic organic compound.

19. The air conditioning system of claim 15 or 16, wherein the liquid absorbent is made of a water solution of metallic halide.

20. The air conditioning system of claim 15 or 16, wherein the dehumidifying means (60) comprises a circulation circuit (64) that includes a moisture absorbing section

(65) for contacting the liquid absorbent with the primary air and a moisture releasing section (66) for contacting the liquid absorbent with the secondary air and circulates the liquid absorbent between the moisture absorbing section (65) and the moisture releasing section (66).

21. The air conditioning system of claim 11, further comprising humidity adjusting means (90) for adding part of moisture being released from the humidity medium to part of the secondary air supplied to the dehumidifying means (60) and then supplying the part of the secondary air to the room, while adding the remaining part of moisture being released from the humidity medium to the remaining part of the secondary air, cooling and dehumidifying the remaining part of the secondary air through heat exchange with the secondary air not yet supplied to the heat exchanger (30) and then supplying the remaining part of the secondary air to the room.

* * * * *

UNITED STATES PATENT AND TRADEMARK OFFICE

CERTIFICATE OF CORRECTION

PATENT NO. : 6,484,525 B1
DATED : November 26, 2002
INVENTOR(S) : Chun-cheng Piao et al.

It is certified that error appears in the above-identified patent and that said Letters Patent is hereby corrected as shown below:

Title page,
Item [56], References Cited, U.S. PATENT DOCUMENTS, add
-- 4,665,715 05/1987 Signoret --,
-- 5,323,624 06/1994 Schwalm --,
-- 5,555,745 09/1996 Agahi et al --,
-- 5,642,629 07/1997 Ohman --.
FOREIGN PATENT DOCUMENTS, add
-- WO 96/23188 08/1996 --.
OTHER PUBLICATIONS, add
-- "Shin-ban Reito-Kucho-Binran Dai-4-han Kiso-hen", pp 45-48, 1981, Japan Society of Refrigerating and Air Conditioning Engineers (with a partial English translation) --,
-- "Air Cycle Refrigeration", pp 16-21, 1997, AIRAH JOURNAL --

Signed and Sealed this

Twenty-ninth Day of July, 2003

JAMES E. ROGAN
*Director of the United States Patent and Trademark Office*